United States Patent Office 2,859,248
Patented Nov. 4, 1958

2,859,248
OXIDATION OF ORGANIC SULFIDES

Rector P. Louthan, Bartlesville, Okla., assignor to Phillips Petroleum Company, a corporation of Delaware No Drawing. Application July 11, 1956
Serial No. 597,092

18 Claims. (Cl. 260—607)

This invention relates to oxidation of organic sulfides. In one aspect the invention relates to the oxidation of organic sulfides in the presence of a catalyst system comprising at least one of certain halogen compounds and at least one of nitric acid ($HNO_3$) and nitrogen dioxide to produce the corresponding sulfoxide. In one aspect the organic sulfide oxidized according to the invention has the formula R—S—R wherein each R is a hydrocarbon radical and the catalyst system comprises at least one of $HNO_3$ and $NO_2$ and at least one of $CuCl_2$, CuBr, $CuBr_2$ and HBr. In another aspect of the invention the organic sulfide oxidized has the formula R—S—R wherein each R is a hydrocarbon radical or a hydroxy substituted hydrocarbon radical, at least one of the latter radicals being present, and the catalyst system comprises at least one of $HNO_3$ and $NO_2$ and at least one of $CuCl_2$, CuBr and $CuBr_2$.

An object of the invention is to provide a process for the oxidation of organic sulfides to produce greater yields and conversion to the sulfoxide. An important object is to increase the speed of oxidation of organic sulfides to sulfoxides with an oxygen-containing fluid or gas.

Other aspects and objects of this invention, as well as advantages, are apparent hereinafter.

Various methods have been employed in the past to oxidize organic sulfides to sulfoxides. One method which has been used, to oxidize dimethylsulfide to dimethylsulfoxide, employs oxygen as the oxidizing agent and nitrogen dioxide as the catalyst. This method is a gas phase oxidation, and is disclosed in U. S. 2,581,050. However, while the gas phase oxidation is satisfactory for oxidizing dimethylsulfide to dimethylsulfoxide, it is unsatisfactory for the production of other sulfoxides, and in addition, the $NO_2$ catalyst is not satisfactory when employed in some liquid phase oxidations of sulfides to sulfoxides, e. g., in the oxidation of tertiary alkyl or 2-hydroxyethyl sulfides.

According to the invention there is provided a method for production of organic sulfoxides which comprises the oxidation of organic sulfides having the formula R—S—R wherein each R is selected from the group consisting of a hydrocarbon radical containing no ethylenic or acetylenic unsaturation and a hydroxy hydrocarbon radical containing no ethylenic or acetylenic unsaturation, in the presence of a catalyst system comprising a nitrogen compound consisting of at least one of the group consisting of $HNO_3$ and $NO_2$ and a halogen compound consisting of at least one of the group consisting of $CuCl_2$, CuBr, $CuBr_2$, and HBr, with the proviso that, where one of the R's contains a hydroxy group, HBr is not employed in said catalyst system. The R's can be alike or different. In one preferred embodiment of this invention, one of the R's is a radical

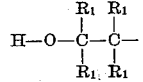

wherein each $R_1$ is selected from the group consisting of hydrogen and a hydrocarbon radical containing no ethylenic or acetylenic unsaturation. In either of the above formulas the hydrocarbon radicals are generally selected from the group consisting of alkyl, cycloalkyl, aryl, aralkyl, or alkaryl radicals, and the hydroxy hydrocarbon radicals are preferably selected from these hydrocarbon radicals containing a hydroxy group as a substituent, preferably the number of carbon atoms in each R in the formula R—S—R above does not exceed 20 carbon atoms, and the total carbon atoms does not exceed 30 carbon atoms.

Some examples of compounds of the general formula R—S—R are dimethyl sulfide, ethyl n-propyl sulfide, tertiary butyl ethyl sulfide, isopropyl n-octyl sulfide, diphenyl sulfide, ethyl cyclohexyl sulfide, tertiary octyl p-tolyl sulfide, dibenzyl sulfide, 2-hydroxyethyl n-butyl sulfide, 2-hydroxy-n-butyl phenyl sulfide, 2-hydroxyethyl cyclohexyl sulfide, 3-hydroxy propyl benzyl sulfide, 4-hydroxy butyl tert-octyl sulfide, 2-hydroxyethyl methyl sulfide, n-eicosyl tert-decyl sulfide, n-decyl cyclohexyl sulfide, tert-dodecyl 3-phenylbutyl sulfide, 1,8-diphenyl-2-hydroxy-n-octyl methyl sulfide, 1,4-di-tert-butyl-5,5-dimethyl-2-hydroxy-n-hexyl n-octyl sulfide and 4-cyclohexyl-1-methyl-2-hydroxy-n-butyl n-dodecyl sulfide.

The oxidation of sulfides to sulfoxides by the method of this invention can be carried out in a liquid full reactor or in a reactor which contains a vapor space above a liquid phase. The preferred method of operation is to utilize a "mixed-phase," i. e., a vapor space above a liquid phase. The oxidizing agent can be either air, an oxygen containing gas, or oxygen, but oxygen is preferred. If air is used, means for venting the inert gases is provided. In the terms "oxygen" and "oxygen-containing gas" herein the word oxygen has its commonly accepted meaning, i. e., elemental oxygen.

It is believed that the $NO_2$ or $HNO_3$ present as a member of the catalyst composition is converted to $N_2O_5$, which is believed to be the active oxidizing agent. The $NO_2$ can be supplied to the reaction as liquid $NO_2$, while if $HNO_3$ is employed, it can be supplied as concentrated nitric acid, e. g., aqueous solutions containing above 60 percent by weight but less than fuming nitric acid. The $NO_2$ or $HNO_3$ catalyst member can be supplied to the reaction zone in an amount within the range of 0.5 to 10.0 percent by weight based on the organic sulfide to be oxidized, preferably within the range of from 1.0 to 5.0 percent on the same basis.

The $CuCl_2$, CuBr, $CuBr_2$ or HBr can be supplied to the reaction in an amount within the range of 0.05 to 20.0 percent by weight based on the organic sulfide to be oxidized, preferably 0.1 to 15.0.

The $CuCl_2$, CuBr or $CuBr_2$ can be supplied to the reaction zone as solids or as solutions in water or other solvents. Similarly, the HBr can be supplied to the reaction zone as a gas or as a solution in water or other suitable solvent, as for example, acetic acid. The use of solvents which are easily oxidized, alcohols for example, should be avoided.

The oxidation reaction of this invention can be carried out at any temperature above the freezing point of the organic sulfide being oxidized, yet below a temperature at which the vapor pressure of the organic sulfide reaches 100 p. s. i. a. Operation above this pressure is possible, but is hazardous. The reaction time can vary between 45 minutes and 8 hours, although the oxidation of a sulfide to a sulfoxide using the method of this invention is usually completed before eight hours has elapsed.

The oxidation process of the present invention can be carried out in the presence of a diluent, if desired. Suitable diluents include, for example, any liquid saturated hydrocarbon having a vapor pressure of less than 100 p. s. i. a. at the temperature at which the reaction is carried out.

The sulfoxides which are produced by the method of the present invention are useful as pickling agents for metals, as selective solvents, and as plant defoliants. The use of sulfoxides as plant defoliants is disclosed in U. S. Patent 2,654,667, of L. D. Goodhue et al.

The method of the present invention, whereby sulfides are oxidized to sulfoxides, can be carried out in either a batch-wise or continuous manner.

*Example I*

Tert-butyl ethyl sulfide was oxidized to the sulfoxide using the method of the prior art in which $NO_2$ was used as the catalyst and oxygen as the oxidizing agent.

Two hundred grams of tert-butyl ethyl sulfide and 2.0 grams of liquid $NO_2$ were charged to a 1-liter 3-necked flask equipped with a stirrer. Oxygen was fed from an oxygen cylinder through another 1-liter 3-necked flask which was fitted with a mercury bubbler. This mercury bubbler vented oxygen if the back pressure reached too high a level. The oxygen then passed through a wet test meter and thence to the reaction flask. Only enough sulfide and catalyst were charged to the reaction flask to fill a portion of the flask. The wet test meter, a commercial displacement meter, actually measured the amount of oxygen absorbed by the material being oxidized. At the beginning of the run, the theoretical amount of oxygen required to convert the sulfide to the sulfoxide was calculated. This theoretical amount was measured on the wet test meter, and, when this theoretical amount had been absorbed, the reaction was stopped.

The run was started, at which time the temperature was noted to be 26° C. After 10 minutes, an additional 1.0 gram of $NO_2$ was added in an attempt to speed up the reaction. Again after 15 minutes, 1.0 gram of $NO_2$ was added, and after another 15 minutes, 3.0 more grams of $NO_2$ were added. After another 10 minutes, 2.0 grams of $NO_2$ were added, and, 5 minutes later, 30 grams of tert-butyl ethyl sulfide were added. Thereafter, 2 grams of $NO_2$ were added every ten minutes for 40 minutes, and an additional 3 grams of $NO_2$ were added at the end of this period. The reaction was allowed to continue for 15 minutes, after which 2 grams of $NO_2$ were added, and the reaction was then allowed to continue for 45 more minutes. At the end of this time the reaction was stopped. When the product was distilled, 140.6 grams of tert-butyl ethyl sulfoxide were recovered, representing a yield of 45.9 percent (ultimate) and a conversion of 79.5 percent.

*Example II*

One hundred fifty grams of tert-butyl ethyl sulfide, 15 grams of cupric bromide, and 5 cc. of concentrated $HNO_3$ (71% $HNO_3$ by weight—density 1.42) were charged to the apparatus of Example I. The reaction was started by admitting gaseous oxygen as in Example I. The temperature at startup was approximately 25° C. After 40 minutes, the theoretical amount of oxygen had been absorbed, 0.611 cubic foot at the prevailing conditions, so the oxygen was turned off and the product recovered. The temperature at the end of the run was 52° C.

The product recovered was distilled and 137.6 grams of tert-butyl ethyl sulfoxide were recovered, representing an ultimate yield of 87.0 percent. The refractive index of this product was $n^{20}_D=1.4680$, while the boiling point was 83.5° C. at 5 mm. Hg.

The recovered product from several runs in which tert-butyl ethyl sulfide was oxidized to tert-butyl sulfoxide by the method of this invention was combined and redistilled. The boiling point of the purified material was 80° C. at 5.0 mm. Hg, while the refractive index of this purified material was found to be $n^{20}_D=1.4682$. An elemental analysis for tert-butyl ethyl sulfoxide was found to be:

|   | Calculated, percent | Found |
|---|---|---|
| C | 53.7 | 53.5%. |
| H | 10.5 | 10.6%. |
| S | 23.9 | 24.3%. |
| O | 11.9 | 11.6% by difference. |

*Example III*

One hundred fifty grams of tert-butyl ethyl sulfide, 15 grams of cuprous bromide, and 5 cc. of concentrated $HNO_3$ (71% $HNO_3$ by weight—density 1.42) were charged to the reactor of Example I. The oxygen was turned on, and the reaction started. The initial temperature was 25° C., while the final temperature, after a reaction time of 150 minutes, was 77° C. The highest temperature reached was 85° C. The amount of oxygen absorbed was 0.587 cubic foot (measured at the prevailing conditions). One hundred seventeen and five-tenths grams of tert-butyl ethyl sulfoxide were recovered after distilling the reactor effluent, representing an ultimate yield of 80.8%. The conversion of sulfide to sulfoxide in this run was 86.6%. The product had a boiling point of 82° C. at 5.5 mm. Hg and a refractive index at 20° C. of 1.4685.

*Example IV*

One hundred fifty grams of tert-butyl ethyl sulfide, 15 grams of cupric chloride, and 5 cc. of $HNO_3$, identical with that of the previous examples, was charged to the reactor of Example I. The oxygen was turned on, and the reaction time for this run was 180 minutes, while the temperature varied from an initial value of 25° C. to a final value of 67° C. The highest temperature reached in this run was 76° C. During this run, a precipitate was formed, so 3 cc. of HCl were added. One hundred five and nine-tenths grams of product, boiling point 88° C. at 5.5 mm. Hg—$n^{20}_D=1.4682$, were recovered, representing a conversion per pass of 83.0% and an ultimate yield of 75.5%.

*Example V*

One hundred fifty grams of tert-butyl ethyl sulfide, 2 cc. of a solution of HBr in acetic acid which contained 30–32% HBr by weight (solution density—1.30), and 2 cc. of concentrated $HNO_3$ (identical to that used in previous examples) were charged to the reactor of Example I and the oxidation started. The reaction time for this run was 57 minutes, the temperature varied from 46° C. initially to 76° C. finally, and the amount of oxygen absorbed was 0.578 cubic foot (measured at prevailing conditions). One hundred twenty-two and five-tenths grams of tert-butyl ethyl sulfoxide were recovered by distilling the reactor effluent, representing a conversion of sulfide of 87.2% and an ultimate yield of 82.3% of sulfoxide. The product boiled at 82–86° C. at 5 mm. of Hg.

*Example VI*

One hundred fifty grams of 2-hydroxyethyl n-butyl sulfide and 2 grams of liquid $NO_2$ were charged to the reactor of Example I. The 2-hydroxyethyl n-butyl sulfide was prepared by condensing one mol of ethylene oxide with one mol of n-butyl mercaptan. The oxygen flow to the reactor was started, but after 45 minutes, only 0.016 cubic foot of oxygen had been absorbed. At this point, 10 grams of $CuCl_2.2H_2O$, dissolved in 15 cc. of water, was added to the reactor. Ninety minutes after this addition, the total oxygen absorbed was found to be 0.229 cubic foot. At this point, an additional 5 grams of solid $CuCl_2.2H_2O$ was added. The reaction continued for 197 minutes after this second addition, at which time the reaction was stopped. The total oxygen absorbed was found to be 0.493 cubic foot. The total reaction time was 332 minutes, and the temperature varied from 25° C. initially to 88° C. at the end of the run.

The reactor effluent was stirred for 30 minutes with 25 grams of anhydrous $K_2CO_3$, diluted with 500 cc. of benzene, filtered, and heated under vacuum to remove the benzene.

The material was then distilled to yield 118 grams of product boiling at 122–125° C. at 0.2–0.4 mm. Hg. This represents a yield (ultimate) of 77.7% and a conversion of 91%. The material was recrystallized from an isopropyl alcohol-ether mixture, and the refractive index for this purified 2-hydroxyethyl n-butyl sulfoxide was found to be 1.4895.

Samples of 2-hydroxyethyl n-butyl sulfoxide from other runs were combined, purified and analyzed. The refractive index was 1.4905 and the elemental analysis was found to be:

|   | Calculated, percent | Found, percent |
|---|---|---|
| C | 48.0 | 47.6 |
| H | 9.3 | 9.67 |
| S | 21.3 | 20.4 |

In the practice of the invention, the catalyst can be added to the reaction zone separately or in combination before or after the addition of the organic sulfide, and all at once, or in step-wise, or in a continuous fashion, as will be understood by those skilled in the art.

As will be evident to those skilled in the art, various modifications of this invention can be made or followed in the light of the foregoing disclosure and discussion without departing from the spirit or scope of the disclosure or from the scope of the claims.

I claim:

1. A method for the production of an organic sulfoxide which comprises the oxidation with an elemental oxygen-containing gas of an organic sulfide having the formula RSR wherein each R contains not more than 20 carbon atoms and the total carbon atoms does not exceed 30 carbon atoms and wherein each R is selected from the group consisting of an alkyl, cycloalkyl, aryl, aralkyl, alkaryl radical, and one of said radicals containing a hydroxy group as a substituent, in the presence of a catalyst system comprising a nitrogen compound consisting of at least one of the group consisting of $HNO_3$ and $NO_2$ and a halogen compound consisting of at least one of the group consisting of $CuCl_2$, CuBr, $CuBr_2$, and HBr, with the proviso that, where one of the R's contains a hydroxy group, HBr is not selected.

2. A method for the production of an organic sulfoxide which comprises the oxidation with an elemental oxygen-containing gas of an organic sulfide having the formula R—S—R wherein each R contains not more than 20 carbon atoms and the total carbon atoms does not exceed 30 carbon atoms and wherein each R is selected from the group consisting of a hydrocarbon radical containing no ethylenic or acetylenic unsaturation and a hydroxy hydrocarbon radical containing no ethylenic or acetylenic unsaturation, in the presence of a catalyst system comprising a nitrogen compound consisting of at least one of the group consisting of $HNO_3$ and $NO_2$ and a halogen compound consisting of at least one of the group consisting of $CuCl_2$, CuBr, $CuBr_2$ and HBr, with the proviso that, where one of the R's contains a hydroxy group HBr is not selected.

3. A method for the production of an organic sulfoxide which comprises the oxidation with air of an organic sulfide having the formula R—S—R wherein each R is selected from the group consisting of a hydrocarbon radical containing no ethylenic or acetylenic unsaturation and a hydroxy hydrocarbon radical containing no ethylenic or acetylenic unsaturation, in the presence of a catalyst system comprising a nitrogen compound consisting of at least one of the group consisting of $HNO_3$ and $NO_2$ and a halogen compound consisting of at least one of the group consisting of $CuCl_2$, CuBr, $CuBr_2$ and HBr, with the proviso that, where one of the R's contains a hydroxy group, HBr is not selected.

4. A method for the production of tertiary butyl ethyl sulfoxide, which comprises the oxidation with an elemental oxygen-containing gas of tertiary butyl ethyl sulfide in the presence of a catalyst system comprising at least one nitrogen compound selected from the group consisting of $HNO_3$ and $NO_2$ and at least one halogen compound selected from the group consisting of $CuCl_2$, CuBr, $CuBr_2$, and HBr.

5. A method for the production of an organic sulfoxide which comprises the oxidation with an elemental oxygen-containing gas of a dialkyl sulfoxide wherein each alkyl contains not more than 20 carbon atoms and the total carbon atoms does not exceed 30 carbon atoms in the presence of a catalyst system comprising at least one nitrogen compound selected from the group consisting of $HNO_3$ and $NO_2$ and at least one halogen compound selected from the group consisting of $CuCl_2$, CuBr, $CuBr_2$, and HBr.

6. A method according to claim 1 wherein said nitrogen compound is supplied to the oxidation reaction in an amount within the range from 0.5 to 10 weight percent and the said halogen is supplied in an amount within the range from 0.05 to 20 weight percent, each based on the amount of organic sulfide charged to said oxidation reaction.

7. A method of claim 1 wherein said nitrogen compound is nitrogen dioxide.

8. A method of claim 1 wherein said nitrogen compound is $HNO_3$.

9. A method of claim 1 wherein said nitrogen compound is a mixture of nitrogen dioxide and $HNO_3$.

10. A method of claim 1 wherein said catalyst system contains $CuCl_2$.

11. A method of claim 1 wherein said catalyst system contains CuBr.

12. A method of claim 1 wherein said catalyst system contains $CuBr_2$.

13. A method of claim 1 wherein said catalyst system contains HBr.

14. A method of claim 1 wherein said oxygen-containing gas is oxygen.

15. A method of claim 1 wherein said oxygen-containing gas is oxygen-enriched air.

16. A method of claim 1 wherein said organic sulfide is 2-hydroxyethyl n-butyl sulfide.

17. A method of claim 5 wherein said organic sulfide is ethyl n-propyl sulfide.

18. A method of claim 1 wherein said organic sulfide is 4-hydroxybutyl tert-octyl sulfide.

References Cited in the file of this patent

UNITED STATES PATENTS

| 2,539,808 | Brooner | Jan. 3, 1951 |
| 2,702,824 | Wetterholm et al. | Feb. 22, 1955 |

UNITED STATES PATENT OFFICE
CERTIFICATE OF CORRECTION

Patent No. 2,859,248                      November 4, 1958

Rector P. Louthan

It is hereby certified that error appears in the printed specification of the above numbered patent requiring correction and that the said Letters Patent should read as corrected below.

Column 6, line 23, claim 5, for "sulfoxide" read -- sulfide --.

Signed and sealed this 4th day of August 1959.

(SEAL)

Attest:

KARL H. AXLINE
Attesting Officer

ROBERT C. WATSON
Commissioner of Patents